United States Patent
Dai et al.

(10) Patent No.: US 9,716,265 B2
(45) Date of Patent: Jul. 25, 2017

(54) HIGH-DENSITY PRECURSOR FOR MANUFACTURE OF COMPOSITE METAL OXIDE CATHODES FOR LI-ION BATTERIES

(71) Applicant: Apple Inc., Cupertino, CA (US)

(72) Inventors: Hongli Dai, Los Altos, CA (US); Christopher S. Johnson, Naperville, IL (US); Huiming Wu, Darien, IL (US); John David Carter, Bolingbrook, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/449,987

(22) Filed: Aug. 1, 2014

(65) Prior Publication Data
US 2016/0036043 A1    Feb. 4, 2016

(51) Int. Cl.
*H01M 4/36* (2006.01)
*C01G 51/00* (2006.01)
(Continued)

(52) U.S. Cl.
CPC ......... *H01M 4/364* (2013.01); *B01J 19/0006* (2013.01); *B01J 19/0013* (2013.01);
(Continued)

(58) Field of Classification Search
CPC .... H01M 4/364; H01M 4/525; C01G 51/006; C01G 51/04; C01G 51/50; C01G 53/00;
(Continued)

(56) References Cited

U.S. PATENT DOCUMENTS 6,077,496 A    6/2000    Hiraoka et al.
6,677,082 B2   1/2004    Thackeray et al.
(Continued)

FOREIGN PATENT DOCUMENTS

CN    102110808    6/2011
CN    102484249    5/2012
(Continued)

OTHER PUBLICATIONS

Rodrigues et al (A novel coprecipitation method towards the synthesis of NixMnxCo(1-2x)(OH)2 for the preparation of lithium metal oxides, J Solid State Electrochem (2012) 16:1121-1132 published online Jul. 22, 2011).*
(Continued)

*Primary Examiner* — Melvin C Mayes
*Assistant Examiner* — Michael Forrest
(74) *Attorney, Agent, or Firm* — Polsinelli PC

(57) ABSTRACT

The disclosed embodiments relate to the manufacture of a precursor co-precipitate material for a cathode active material composition. During manufacture of the precursor co-precipitate material, an aqueous solution containing at least one of a manganese sulfate and a cobalt sulfate is formed. Next, a $NH_4OH$ solution is added to the aqueous solution to form a particulate solution comprising irregular secondary particles of the precursor co-precipitate material. A constant pH in the range of 10-12 is also maintained in the particulate solution by adding a basic solution to the particulate solution.

5 Claims, 11 Drawing Sheets

(51) Int. Cl.
| | |
|---|---|
| *C01G 51/04* | (2006.01) |
| *C01G 53/00* | (2006.01) |
| *B01J 19/24* | (2006.01) |
| *H01M 4/525* | (2010.01) |
| *B01J 19/00* | (2006.01) |
| *B01J 19/18* | (2006.01) |
| *H01M 10/052* | (2010.01) |
| *H01M 4/505* | (2010.01) |

(52) U.S. Cl.
CPC ........... *B01J 19/0066* (2013.01); *B01J 19/18* (2013.01); *B01J 19/24* (2013.01); *C01G 51/006* (2013.01); *C01G 51/04* (2013.01); *C01G 51/50* (2013.01); *C01G 53/00* (2013.01); *C01G 53/006* (2013.01); *C01G 53/40* (2013.01); *C01G 53/50* (2013.01); *H01M 4/525* (2013.01); *B01J 2219/00051* (2013.01); *B01J 2219/00177* (2013.01); *B01J 2219/24* (2013.01); *C01P 2002/50* (2013.01); *C01P 2002/52* (2013.01); *C01P 2002/72* (2013.01); *C01P 2002/88* (2013.01); *C01P 2004/03* (2013.01); *C01P 2004/32* (2013.01); *C01P 2004/51* (2013.01); *C01P 2004/61* (2013.01); *C01P 2006/11* (2013.01); *C01P 2006/12* (2013.01); *C01P 2006/40* (2013.01); *H01M 4/505* (2013.01); *H01M 10/052* (2013.01)

(58) Field of Classification Search
CPC ...... C01G 53/006; C01G 53/40; C01G 53/50; B01J 19/0006; B01J 19/0013; B01J 19/0066; B01J 19/18; B01J 19/24
See application file for complete search history.

(56) References Cited

U.S. PATENT DOCUMENTS

| | | |
|---|---|---|
| 6,680,143 B2 | 1/2004 | Thackeray et al. |
| 7,135,252 B2 | 11/2006 | Thackeray et al. |
| 7,205,072 B2 | 4/2007 | Kang et al. |
| 7,314,682 B2 | 1/2008 | Thackeray et al. |
| 7,314,684 B2 | 1/2008 | Kang et al. |
| 7,435,402 B2 | 10/2008 | Kang et al. |
| 7,468,223 B2 | 12/2008 | Thackeray et al. |
| 7,732,096 B2 | 6/2010 | Thackeray et al. |
| 7,923,149 B2 | 4/2011 | Hwang et al. |
| 8,148,011 B2 | 4/2012 | Thackeray et al. |
| 8,187,746 B2 | 5/2012 | Chen et al. |
| 8,277,683 B2 | 10/2012 | Deng et al. |
| 8,337,727 B2 | 12/2012 | Chen et al. |
| 8,383,077 B2 | 2/2013 | Thackeray et al. |
| 8,801,960 B2 | 8/2014 | Ueda et al. |
| 2002/0061444 A1 | 5/2002 | Kweon et al. |
| 2002/0114995 A1 | 8/2002 | Thackeray |
| 2002/0136954 A1 | 9/2002 | Thackeray |
| 2005/0026040 A1 | 2/2005 | Thackeray |
| 2006/0081818 A1 | 4/2006 | Ito et al. |
| 2006/0159994 A1 | 7/2006 | Dahn et al. |
| 2007/0202407 A1 | 8/2007 | Eberman et al. |
| 2008/0280205 A1 | 11/2008 | Jiang et al. |
| 2008/0311473 A1 | 12/2008 | Sasaoka et al. |
| 2009/0146115 A1* | 6/2009 | Xiao ............... C01G 53/006 252/519.15 |
| 2009/0200510 A1 | 8/2009 | Watanabe et al. |
| 2010/0086853 A1 | 4/2010 | Venkatachalam et al. |
| 2010/0151332 A1 | 6/2010 | Lopez et al. |
| 2011/0014518 A1 | 1/2011 | Nakai et al. |
| 2011/0017529 A1 | 1/2011 | Durney |
| 2011/0031437 A1 | 2/2011 | Nagase et al. |
| 2011/0052981 A1 | 3/2011 | Lopez et al. |
| 2011/0076564 A1 | 3/2011 | Yu et al. |
| 2011/0111294 A1 | 5/2011 | Lopez et al. |
| 2011/0111298 A1 | 5/2011 | Lopez et al. |
| 2011/0121240 A1 | 5/2011 | Amine et al. |
| 2011/0200880 A1 | 8/2011 | Yu |
| 2011/0244331 A1 | 10/2011 | Karthikeyan et al. |
| 2011/0294006 A1 | 12/2011 | Amine et al. |
| 2011/0294019 A1 | 12/2011 | Amine et al. |
| 2012/0040247 A1 | 2/2012 | Manivannan et al. |
| 2012/0168696 A1 | 7/2012 | Huang et al. |
| 2012/0196176 A1 | 8/2012 | He et al. |
| 2012/0282522 A1 | 11/2012 | Axelbaum et al. |
| 2013/0004826 A1 | 1/2013 | Li et al. |
| 2013/0252107 A1 | 9/2013 | Lee et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |
| 2014/0158932 A1 | 6/2014 | Sun et al. |
| 2014/0175329 A1 | 6/2014 | De Palma et al. |
| 2014/0234715 A1 | 8/2014 | Fasching et al. |
| 2014/0272563 A1 | 9/2014 | Dai et al. |
| 2015/0171423 A1 | 6/2015 | Kim et al. |
| 2015/0243971 A1 | 8/2015 | Cho et al. |

FOREIGN PATENT DOCUMENTS

| | | |
|---|---|---|
| CN | 102544575 | 7/2012 |
| CN | 102646831 | 8/2012 |
| CN | 102386381 | 1/2014 |
| CN | 103872302 | 6/2014 |
| JP | 4-267053 | 9/1992 |
| JP | 2009-4311 | 1/2009 |
| JP | 2015-213038 | 11/2015 |
| KR | 10-2014-0073856 | 6/2014 |
| TW | 201126798 | 8/2011 |
| TW | 201342695 | 10/2013 |
| WO | WO 2004/107480 | 12/2004 |
| WO | WO 2008/069351 | 6/2008 |
| WO | WO 2010/011569 | 1/2010 |
| WO | WO 2014/119165 | 8/2014 |

OTHER PUBLICATIONS

Zhao et al., "Progress of Research on the Li-rich Cathode Materials $xLi_2MnO_3 \cdot (1-x)LiMO_2 (M=Co, Fe, Ni_{1/2}Mn_{1/2}...)$ for Li-ion Batteries," *Journal of Inorganic Materials*, vol. 26(7), pp. 673-679, Jul. 2011.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3—LiMo2 Materials in Li De-Intercalation Process," *Photon Factory Activity Report*, 2012, vol. 29, No. 2011, 1 pp.

Dou et al., "Synthesis and electrochemical properties of layered LiNi0.5—xMn0.5—xCo2xO2 for lithium-ion battery from nickel manganese cobalt precursor," *J Solid State Electrochem*, (2011), vol. 15, pp. 399-404.

Li, "Layered Oxides Li1+xM1-x02 (M = Ni, Mn, Co, Al) As Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Giordano et al., "Metal Nitride and Metal Carbide Nanoparticles by a Soft Urea Pathway," Chem. Mater., 2009, vol. 21, pp. 5136-5144.

* cited by examiner

HIGH-DENSITY PRECURSOR FOR MANUFACTURE OF COMPOSITE METAL OXIDE CATHODES FOR LI-ION BATTERIES

U.S. GOVERNMENT LICENSE RIGHTS

This invention was made with U.S. government support under WFO Proposal No. 85F59. The U.S. government has certain rights in the invention.

RELATED APPLICATION

The subject matter of this application is related to the subject matter in a co-pending non-provisional application by inventors Hongli Dai, Christopher S. Johnson and Huiming Wu, entitled "High Voltage, High Volumetric Energy Density Li-Ion Battery Using Advanced Cathode Materials," having Ser. No. 14/206,654, and filing date 12 Mar. 2014.

BACKGROUND

Field

The disclosed embodiments relate to rechargeable batteries. More specifically, the disclosed embodiments relate to high-density precursors for the manufacture of composite-layered metal oxide cathodes for lithium-ion batteries.

Related Art

Rechargeable batteries are widely used for energy storage in a variety of consumer, medical, aerospace, defense, and/or transportation applications. The most commonly used type of rechargeable battery is a lithium battery, which can include a lithium-ion or a lithium-polymer battery. As battery-powered devices become increasingly small and more powerful, batteries powering these devices need to store more energy in a smaller volume. Thus, a key requirement of secondary (i.e., rechargeable) batteries for consumer electronic device applications is high volumetric energy density.

A secondary lithium-ion battery provides a high specific capacity, good cycleablility and high energy density that can be used safely. A secondary battery includes a positive electrode (cathode), a negative electrode (anode), an electrolyte, and a separator. Normally, the current commercial cathode for consumer electronics devices is layered lithium cobalt oxide, or $LiCoO_2$. To achieve a high energy density for the cathode, lithium cobalt oxide should have a large particle size with a uniform distribution and low surface area. Preferably, the median particle size D50 is greater than 15 microns, and the Brunauer-Emmett-Teller (BET) surface area is less than 0.5 m$^2$/g.

Currently, $LiCoO_2$ is prepared by calcining $Co_3O_4$ with $Li_2CO_3$ at high temperatures (800-1020° C.) to get large particles. However, the use of high temperatures to produce large particles may result in difficulties in obtaining a uniform particle distribution, batch-to-batch reproducibility and/or control of chemical stoichiometry.

Consequently, use of batteries in portable electronic devices may be improved by techniques for manufacturing high-volumetric-density active material compositions with uniform particle distributions, batch-to-batch reproducibility and/or control of chemical stoichiometry.

SUMMARY

The disclosed embodiments relate to the manufacture of a precursor co-precipitate material for a cathode active material composition. During manufacture of the precursor co-precipitate material, an aqueous solution containing at least one of a manganese sulfate and a cobalt sulfate is formed and fed into a reactor. Next, a $NH_4OH$ solution is added to the aqueous solution to form a particulate solution containing irregular secondary particles of the precursor co-precipitate material. A constant pH in the range of 10-12 is also maintained in the particulate solution by adding a basic solution to the particulate solution.

In some embodiments, the particulate solution is also agitated to form spherical co-precipitate particles from the irregular secondary particles.

In some embodiments, the spherical co-precipitate particles are filtered from the particulate solution, washed, and dried.

In some embodiments, the particulate solution is maintained at a constant temperature in the range of 30-65° C.

In some embodiments, the particulate solution is agitated for 3-72 hours or continuously.

In some embodiments, the spherical co-precipitate particles have a median particle size of greater than 5 microns.

In some embodiments, the basic solution contains at least one of an alkali metal hydroxide, an alkali carbonate, and an alkali oxalate.

In some embodiments, a concentration of the alkali metal hydroxide in the basic solution ranges from 0.5 mol/L to 10 mol/L.

In some embodiments, the precursor co-precipitate material has a composition represented by $Mn_xM_yCo_z(OH)_2$.

In some embodiments, M includes one or more metal cations selected from one or more monovalent, divalent, trivalent or tetravalent cations and Ru, examples of which include $Li^+$, $Ni^{2+}$, $Ni^{3+}$, $Cu^+$, $Cu^{2+}$, $Mg^{2+}$, $Zn^{2+}$, $B^{3+}$, $Ga^{3+}$, $Al^{3+}$, $Mn^{3+}$, $Mn^{4+}$, $Sn^{4+}$, $Ti^{4+}$, and/or $Ru^{4+/5+/6+}$. If M is a mixture of metal cations, the stoichiometric numbers of the metal cations do not have to be equal.

In some embodiments, the particulate solution is formed in an inert gas atmosphere.

In some embodiments, a concentration of manganese, M, and cobalt sulfates in the aqueous solution ranges from 0.5 mol/L to 5 mol/L.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments relate to the manufacture of a precursor co-precipitate material for a cathode active material composition. The cathode active material composition may be used in an electrode of a rechargeable battery cell, such as a lithium-ion or lithium-polymer cell.

More specifically, the disclosed embodiments provide a method and apparatus for manufacturing manganese cobalt-rich hydroxide precursors that have unusually large particle size (e.g., 1-40 micron) with uniform narrow distribution, for the subsequent production of cathode active material compositions for secondary lithium-ion batteries. The hydroxide particles may contain Mn and/or Co, and the precursor composition may be represented by $Mn_xM_yCo_z(OH)_2$. M may include one or more metal cations selected preferably from one or more monovalent, divalent, trivalent or tetravalent cations and Ru, examples of which may be $Li^+$, $Ni^{2+}$, $Ni^{3+}$, $Cu^+$, $Cu^{2+}$, $Mg^{2+}$, $Zn^{2+}$, $B^{3+}$, $Ga^{3+}$, $Al^{3+}$, $Mn^{3+}$, $Mn^{4+}$, $Sn^{4+}$, $Ti^{4+}$, and/or $Ru^{4+/5+/6+}$. If M is a mixture of metal cations, the stoichiometric numbers of the metal cations do not have to be equal. In the precursor composition, $x+y+z=1.00$, and x may range from 0.01 to less than 1.00 ($0.01 \leq x < 1.00$). y may range from 0 to less than 1.00 ($0 \leq y < 1.00$), and z may range from 0.5 to less than 1.00 ($0.50 \leq z < 1.00$). Preferably, $0.01 \leq x \leq 0.30$, $0 \leq y \leq 0.20$, and $0.70 \leq z < 1.00$.

During manufacture of the precursor co-precipitate material, an aqueous solution containing at least one of a manganese sulfate and a cobalt sulfate is formed and fed into a reactor. Next, a $NH_4OH$ solution is added to the aqueous solution to form a particulate solution containing irregular secondary particles of the precursor co-precipitate material. A constant pH in the range of 10-12 is also maintained in the particulate solution by adding a basic solution to the particulate solution.

Figure 1:
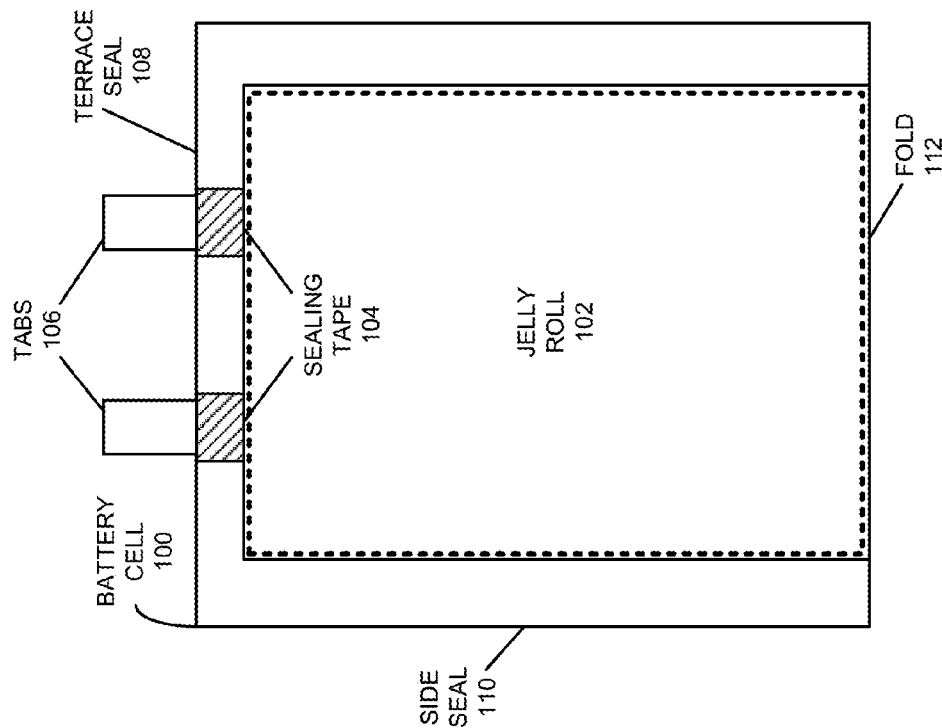
FIG. 1 shows a top-down view of a battery cell in accordance with the disclosed embodiments.

FIG. 1 shows a top-down view of a battery cell 100 in accordance with an embodiment. Battery cell 100 may correspond to a lithium-ion or lithium-polymer battery cell that is used to power a device used in a consumer, medical, aerospace, defense, and/or transportation application. Battery cell 100 includes a jelly roll 102 containing a number of layers which are wound together, including a cathode with an active coating, a separator, and an anode with an active coating. More specifically, jelly roll 102 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Alternatively, the layers may be stacked and/or used to form other types of battery cell structures, such as bi-cell structures. Jelly rolls are well known in the art and will not be described further.

During assembly of battery cell 100, jelly roll 102 is enclosed in a flexible pouch, which is formed by folding a flexible sheet along a fold line 112. For example, the flexible sheet may be made of aluminum with a polymer film, such as polypropylene. After the flexible sheet is folded, the flexible sheet can be sealed, for example by applying heat along a side seal 110 and along a terrace seal 108. The flexible pouch may be less than 120 microns thick to improve the packaging efficiency and/or energy density of battery cell 100.

Jelly roll 102 also includes a set of conductive tabs 106 coupled to the cathode and the anode. Conductive tabs 106 may extend through seals in the pouch (for example, formed using sealing tape 104) to provide terminals for battery cell 100. Conductive tabs 106 may then be used to electrically couple battery cell 100 with one or more other battery cells to form a battery pack. For example, the battery pack may be formed by coupling the battery cells in a series, parallel, or series-and-parallel configuration. The coupled cells may be enclosed in a hard case to complete the battery pack, or the coupled cells may be embedded within the enclosure of a portable electronic device, such as a laptop computer, tablet computer, mobile phone, personal digital assistant (PDA), digital camera, and/or portable media player.

Figure 2:
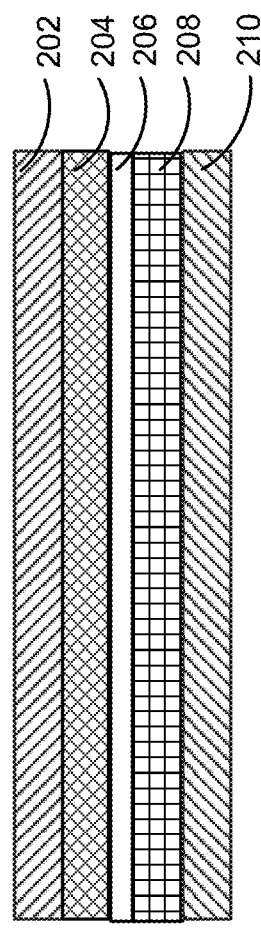
FIG. 2 shows a set of layers for a battery cell in accordance with the disclosed embodiments.

FIG. 2 shows a set of layers for a battery cell (e.g., battery cell 100 of FIG. 1) in accordance with the disclosed embodiments. The layers may include a cathode current collector 202, cathode active coating 204, separator 206, anode active coating 208, and anode current collector 210. Cathode current collector 202 and cathode active coating 204 may form a cathode for the battery cell, and anode current collector 210 and anode active coating 208 may form an anode for the battery cell. The layers may be wound or stacked to create the battery cell.

As mentioned above, cathode current collector 202 may be aluminum foil, cathode active coating 204 may be a lithium compound, anode current collector 210 may be copper foil, anode active coating 208 may be carbon, and separator 206 may include a conducting polymer electrolyte.

For example, cathode active coating 204 may include a cathode active material composition represented by $xLi_2M'O_3 \cdot (1-x)LiCo_yM''_{(1-y)}O_2$. M' may be Mn, Ti, Ru, Zr or a mixture thereof, and M'', if present, may include one or more metal cations selected preferably from one or more monovalent, divalent, trivalent or tetravalent cations and Ru, examples of which are $Li^+$, $Ni^{2+}$, $Ni^{3+}$, $Cu^+$, $Cu^{2+}$, $Mg^{2+}$, $Zn^{2+}$, $B^{3+}$, $Ga^{3+}$, $Al^{3+}$, $Mn^{3+}$, $Mn^{4+}$, $Sn^{4+}$, $Ti^{4+}$, and/or $Ru^{4+/5+/6+}$. If M' is a mixture of metal cations, the stoichiometric numbers of the metal cations do not have to be equal. If M'' is a mixture of metal cations, the stoichiometric numbers of the metal cations do not have to be equal as long as their sum total (1-y) ranges from 0 to 0.50 ($0 \leq (1-y) < 0.50$). Those skilled in the art will appreciate that other cathode active material compositions may be used with cathode active coating 204.

Such active material compositions can be used in rechargeable lithium cells and batteries, such as battery cell 100 of FIG. 1 and/or other rechargeable battery cell structures. Unlike conventional active materials, the exemplary cathode active material described above uses $Li_2M'O_3$ to stabilize its structure during repeated lithium intercalation and de-intercalation. The resulting structure contains a $Li_2M'O_3$ domain, which inherently contains the $LiM'_6$ component that stabilizes the entire cathode active material structure during battery charging and discharging. This makes it possible to reversibly extract more lithium ion from the structure.

For example, the disclosed cathode active material composition may provide greater than 60% reversible lithium-ion extraction (reversible capacity of cathode active material>165 mAh/g), and possibly greater than 75% reversible lithium-ion extraction (reversible capacity of cathode active material>200 mAh/g) of the cathode active material's theoretical capacity. Cathode active material compositions represented by $xLi_2M'O_3 \cdot (1-x)LiCo_yM''_{(1-y)}O_2$ are discussed further in a co-pending non-provisional application by inventors Hongli Dai, Christopher S. Johnson and Huiming Wu, entitled "High Voltage, High Volumetric Energy Density Li-Ion Battery Using Advanced Cathode Materials," having Ser. No. 14,206,654, and filing date 12 March 2014, which is incorporated herein by reference.

In the disclosed embodiments, the cathode active material composition for cathode active coating 204 (e.g., the $Li_2M'O_3$-stabilized lithium transition metal oxide and/or other cathode active material composition) is preferably synthesized from a mixed-metal hydrated hydroxide precursor previously made by a solution co-precipitation method. This method provides for the best homogeneous mix of transition metals in the intercalation host.

In one or more embodiments, the mixed-metal hydrated hydroxide precursor includes a nickel manganese cobalt-rich hydroxide precursor with an unusually large particle size (e.g., 10-40 micron) and uniform narrow distribution, for the subsequent production of cathode active material compositions for secondary lithium-ion batteries. The hydroxide particles may contain Mn and/or Co, and the precursor composition may be represented by $Mn_xM_yCo_z(OH)_2$. M may include one or more metal cations selected preferably from one or more monovalent, divalent, trivalent or tetravalent cations and Ru, examples of which are $Li^+$, $Ni^{2+}$, $Ni^{3+}$, $Cu^+$, $Cu^{2+}$, $Mg^{2+}$, $Zn^{2+}$, $B^{3+}$, $Ga^{3+}$, $Al^{3+}$, $Mn^{3+}$, $Mn^{4+}$, $Sn^{4+}$, $Ti^{4+}$, and/or $Ru^{4+/5+/6+}$. If M is a mixture of metal cations, the stoichiometric numbers of the metal cations do not have to be equal. In the precursor composition, x+y+z=1.00, and x may range from 0.01 to less than 1.00 ($0.01 \leq x < 1.00$). y may range from 0 to less than 1.00 ($0 \leq y < 1.00$), and z may range from 0.5 to less than 1.00 ($0.50 \leq z < 1.00$). Preferably, $0.01 \leq x \leq 0.30$, $0 \leq y \leq 0.20$, and $0.70 \leq z < 1.00$.

Figure 3:
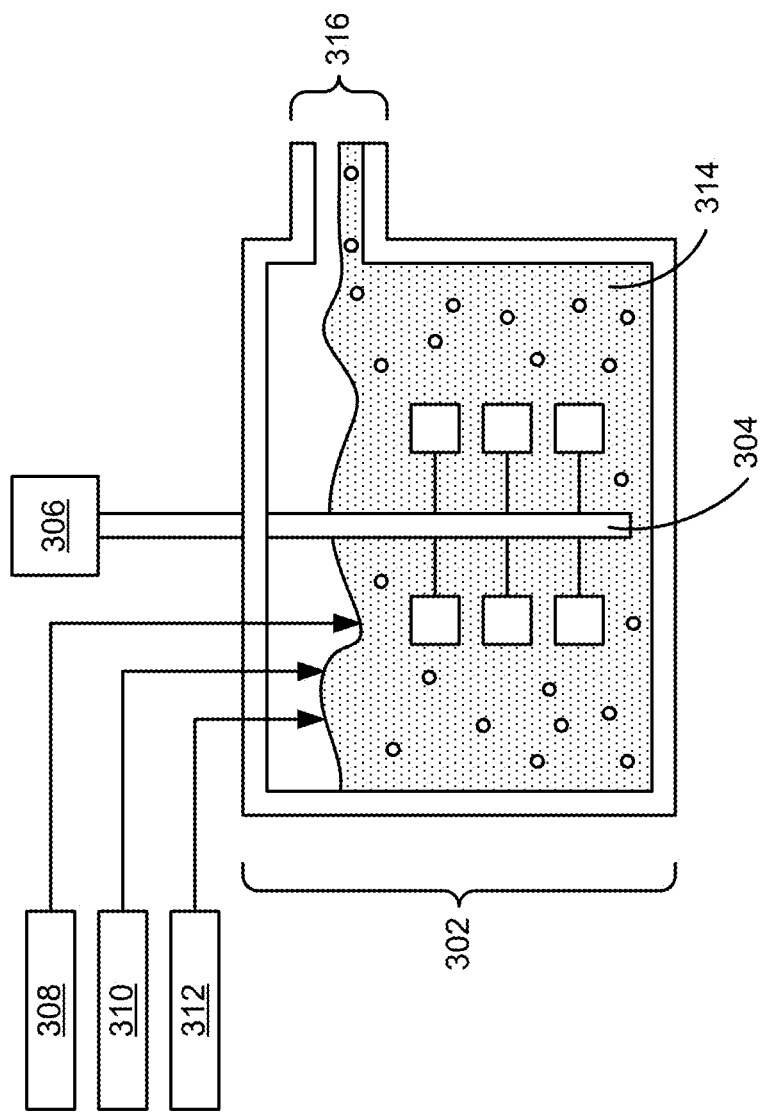
FIG. 3 shows an apparatus for manufacturing a precursor co-precipitate material for a cathode active material composition in accordance with the disclosed embodiments.

As shown in FIG. 3, manganese nickel cobalt hydroxide precursor particles are nucleated and grown in a co-precipitation process where solutions of metal salts and aqueous ammonia are dripped into a reactor 302 such as a continuous stirred-tank reactor (CSTR), preferably at a constant rate. Reactor 302 may be maintained at a constant temperature of 30-65° C., under a controlled atmosphere using flowing nitrogen, argon, and/or other inert gas. A first feeding mechanism 308 may add an aqueous solution containing a manganese sulfate and/or a cobalt sulfate to reactor 302. For example, feeding mechanism 308 may be used to form an aqueous solution of the manganese and/or cobalt sulfates with a concentration ranging from 0.5-5 mol/L in reactor 302.

A second feeding mechanism 310 may add a $NH_4OH$ (e.g., aqueous ammonia) solution as a chelating agent to the aqueous solution to form a particulate solution 314 containing irregular secondary particles of the precursor co-precipitate material. For example, feeding mechanisms 308-310 may be configured to continuously add aqueous solutions of manganese and/or cobalt sulfates and aqueous ammonia, respectively, to reactor 302 to form particulate solution 314. Particulate solution 314 is held to a constant pH, ranging from 10-12, by a pH controller 312 that actuates a pump to inject a basic solution to particulate solution 314. The basic solution may include a dissolved alkali metal (e.g., Li, Na, or K) hydroxide with a concentration ranging from 0.5-10 mol/L, which acts to precipitate the metal ions and provides the counter ion for the precursor solid. Alternatively, an alkali carbonate or oxalate may be substituted for the alkali hydroxide if a carbonate- or oxalate-based precursor is desired.

At the initial stage of the co-precipitation reaction, the irregular secondary particles grow from acicular primary crystals, changing gradually into spherical co-precipitate particles by vigorous stirring by an agitator 304 powered by a motor 306 during a 3-20 hour residence time in reactor 302. Reactor 302 may also contain baffles (not shown) and a draft tube (not shown) to ensure radial mixing and a cyclic vertical flow of particulate solution 314.

When reactor 302 is filled, a uniform mixture of particulate solution 314 is discharged continuously through an overflow tube 316. Spherical co-precipitate particles from the discharged particulate solution 314 are then washed, filtered, and dried. In synthesizing uniform spherical hydroxide particles, the pH, concentration of ammonia, and stirring speed during the co-precipitation reaction are the critical factors in determining the physicochemical properties of the powders. In some cases, surfactant additives are used in the precipitation process.

The following examples describe the principles of the disclosed embodiments as contemplated by the inventors, but they are not to be construed as limiting examples.

EXAMPLE 1

A 3.5-liter CSTR is filled with distilled water and heated to 55° C. The water is purged with nitrogen while stirring at a rate of 1000 rpm. Then, a 1.5-molar aqueous solution of manganese, nickel, magnesium and cobalt sulfate and a 1-molar solution of aqueous ammonia are continuously dripped into the reactor. The pH is fixed at 10.5 by adding a 3-molar aqueous solution of sodium hydroxide using a pH controller/pump. The particles nucleate and grow in the particulate solution for an 8.5-hour run time. The final precursor particles are washed, filtered and dried. FIGS. 4-7 show the characterization of the precursor powder.

Figure 4:
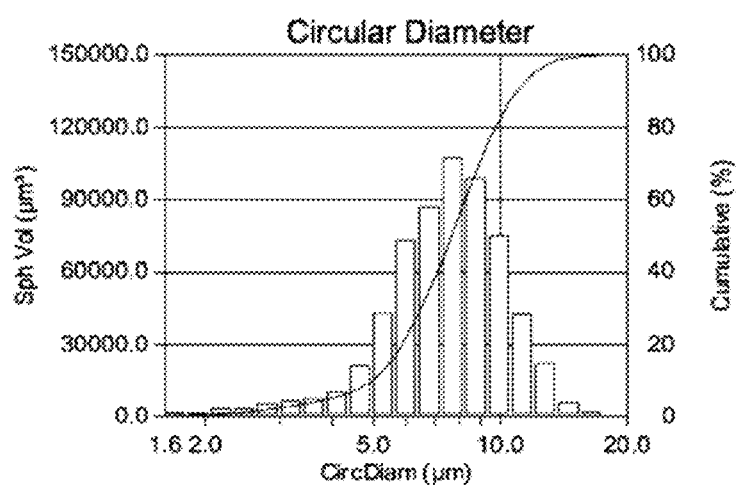
FIG. 4 shows a histogram and a cumulative distribution of the particle sizes of a precursor co-precipitate material for a cathode active material composition in accordance with the disclosed embodiments.

In particular, FIG. 4 shows a histogram and a cumulative distribution of the particle sizes of the resultant precursor co-precipitate material. A particle size analysis of the precursor after 8 hours of growth shows a D50 of 7.7 microns and D10/D90 of 0.45. Moreover, the final precursor particles have a minimum size of 1.60 microns, a maximum size of 16.09 microns, a mean of 7.83 microns, a standard deviation of 2.42 microns, a D10 of 5.01 microns, and a D90 of 10.98 microns. The tap density of the dry powder is measured to be 1.26 g/cm$^3$.

Figure 5:
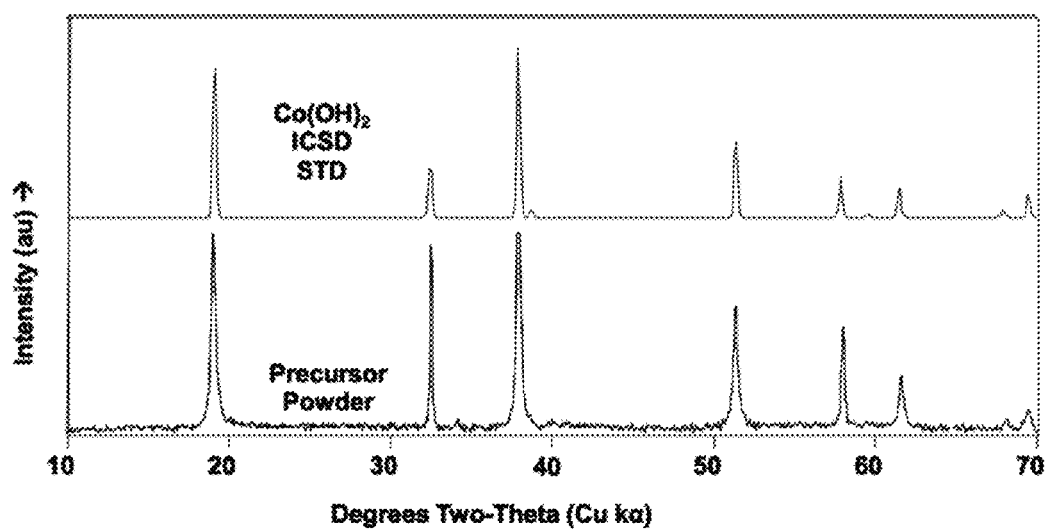
FIG. 5 shows an X-ray powder diffraction (XRD) of a precursor co-precipitate material for a cathode active material composition in accordance with the disclosed embodiments.
Figure 6:
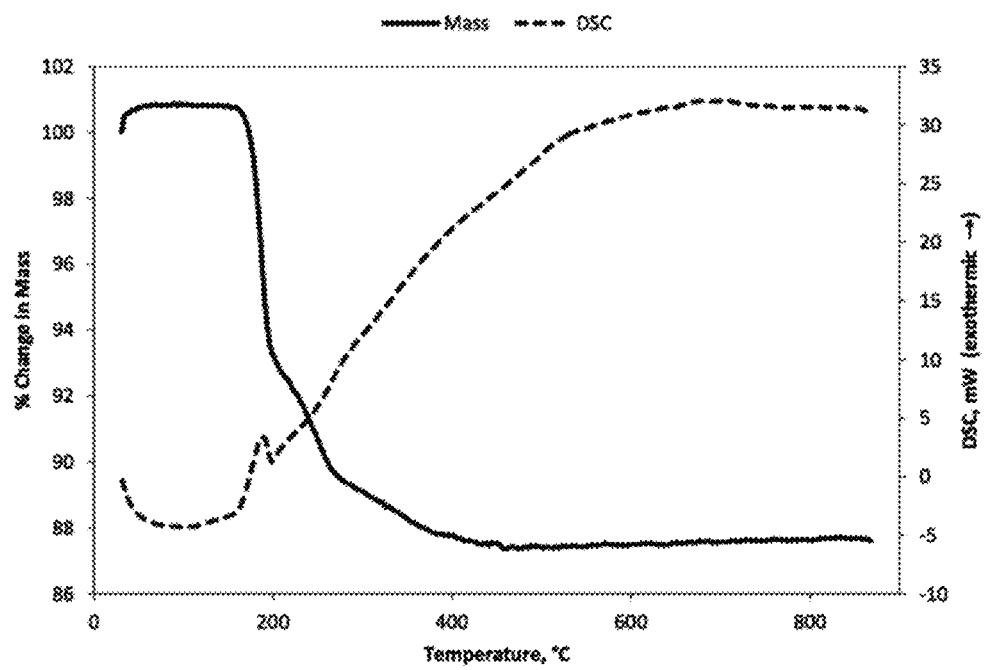
FIG. 6 shows a plot of mass and a differential scanning calorimetry (DSC) curve of a precursor co-precipitate material for a cathode active material composition as a function of temperature in accordance with the disclosed embodiments.
Figure 7:
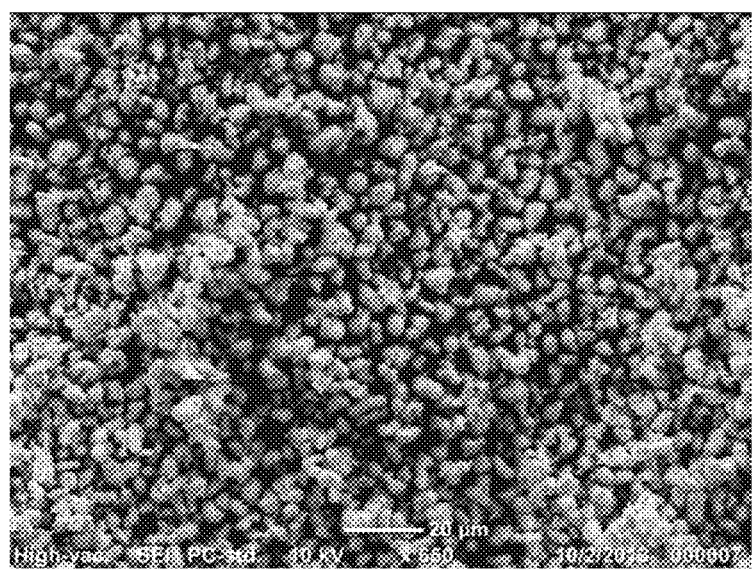
FIG. 7 shows a scanning electron micrograph (SEM) of a precursor co-precipitate material for a cathode active material composition in accordance with the disclosed embodiments.

As shown in FIG. 5, x-ray powder diffraction (XRD) shows a single-phase Co(OH)$_2$ type crystal structure. As shown in FIG. 6, heating the precursor in air shows a multistep exothermic reaction to dehydrate and oxidize the Co(OH)$_2$ particles eventually to Co$_3$O$_4$, with an expected 13.6% weight loss. As shown in the scanning electron micrograph (SEM) of FIG. 7, the particles have an equiaxial shape and a uniform size distribution.

EXAMPLE 2

Figure 8:
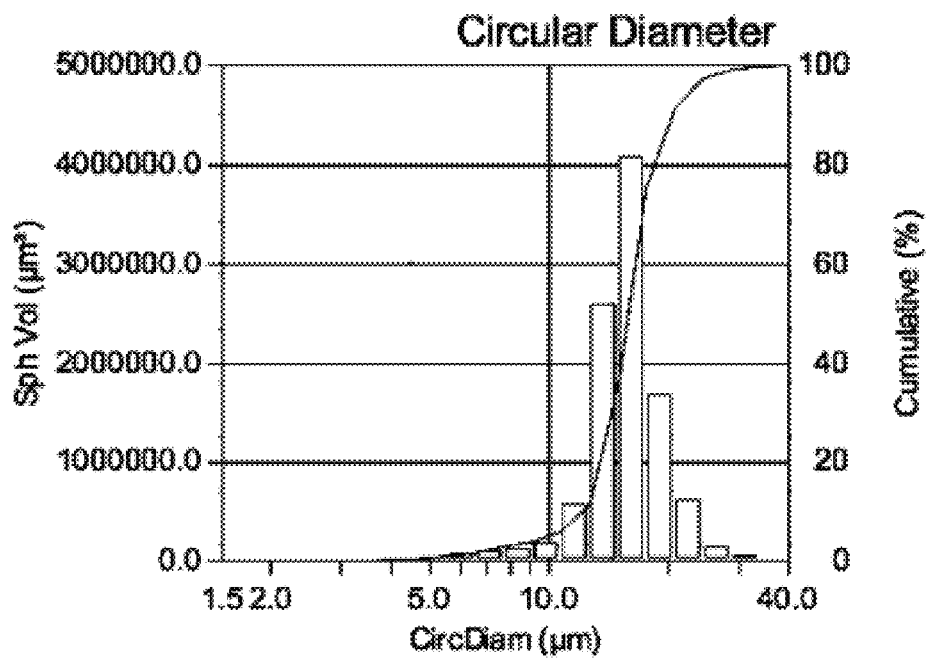
FIG. 8 shows a histogram and a cumulative distribution of the particle sizes of a precursor co-precipitate material for a cathode active material composition in accordance with the disclosed embodiments.

A co-precipitation reaction is run as in Example 1. The pH is set to 11. The water is purged with nitrogen while stirring at a rate of 1200 rpm. Then, a 2-molar aqueous solution of manganese, nickel and cobalt sulfate and a 1.0-molar solution of aqueous ammonia are continuously dripped into the reactor. The final precursor particles are washed, filtered and dried. The plot of FIG. 8 shows a D50 of 15.67 microns and D10/D90 of 0.59. In addition, the final precursor particles have a minimum size of 1.52 microns, a maximum size of 34.24 microns, a mean of 15.90 microns, a standard deviation of 3.73 microns, a D10 of 12.35 microns, and a D90 of 20.09 microns.

EXAMPLE 3

Figure 9:
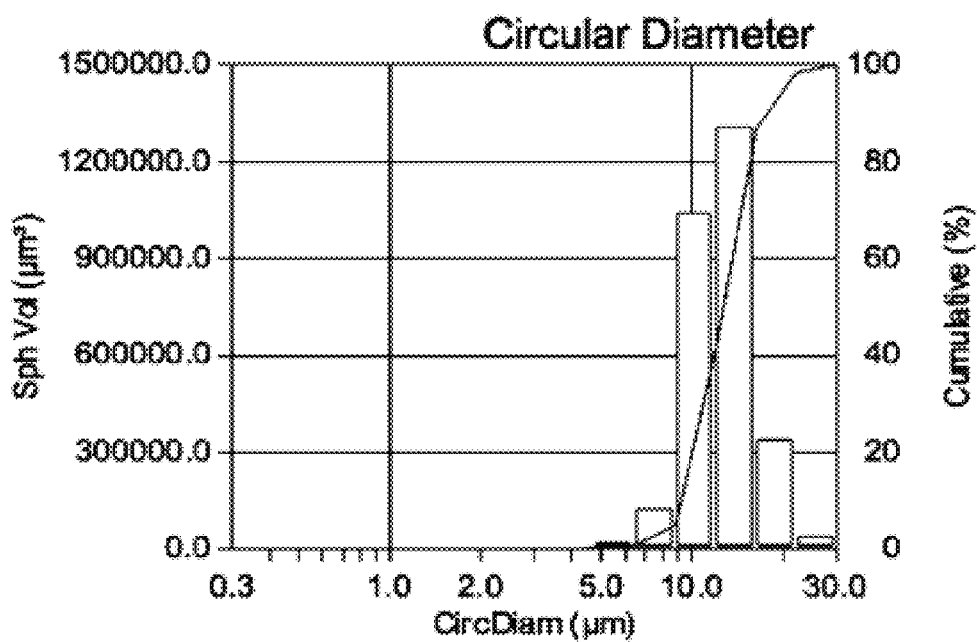
FIG. 9 shows a histogram and a cumulative distribution of the particle sizes of a precursor co-precipitate material for a cathode active material composition in accordance with the disclosed embodiments.

A co-precipitation reaction is run as in Example 1. The CSTR is filled with 2 liters of a 0.5-molar Na$_2$SO$_4$ salt solution. The water is purged with nitrogen while stirring at urate of 1100 rpm. Then, a 1.5-molar aqueous solution of manganese, nickel and cobalt sulfate and a 1-molar solution of aqueous ammonia are continuously dripped into the reactor. The pH is set to 10.5. The final precursor particles are washed, filtered and dried. The plot of FIG. 9 shows a D50 of 12.38 microns and D10/D90 of 0.56. The final precursor particles also have a minimum size of 0.35 microns, a maximum size of 28.45 microns, a mean of 12.95 microns, a standard deviation of 3.19 microns, a D10 of 9.67 microns, and a D90 of 17.18 microns. The tap density of the dry powder is measured to be 0.80 g/cm$^3$.

EXAMPLE 4

Figure 10:
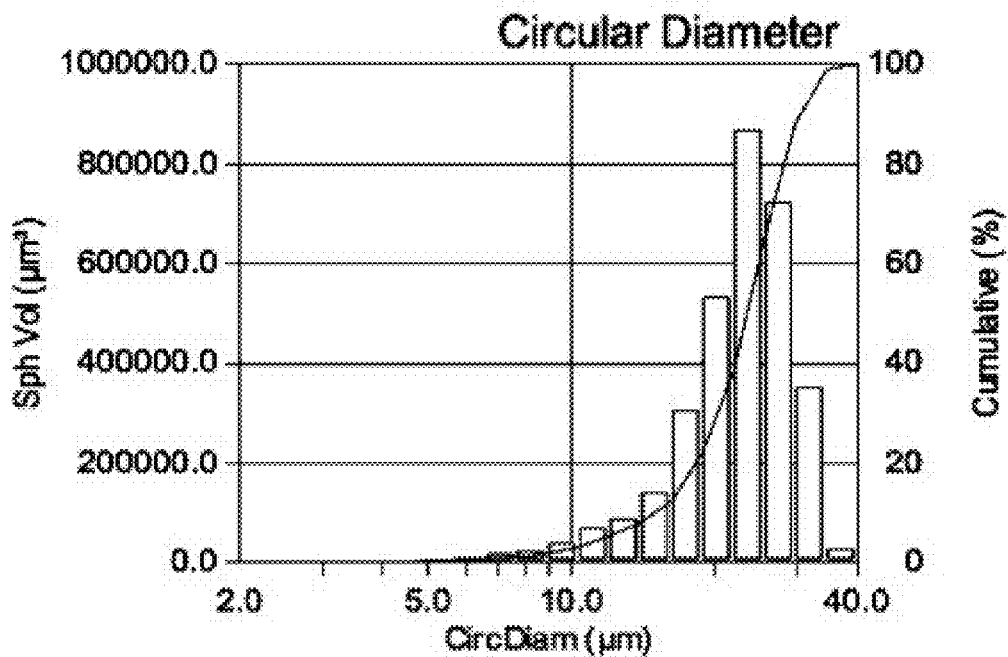
FIG. 10 shows a histogram and a cumulative distribution of the particle sizes of a precursor co-precipitate material for a cathode active material composition in accordance with the disclosed embodiments.

A co-precipitation reaction is run as in Example 1. The reactor is filled with 2 liters of all-molar aqueous ammonia solution. The water is purged with nitrogen while stirring at a rate of 1000 rpm. Then, a 2-molar aqueous solution of cobalt sulfate and a 5-molar solution of aqueous ammonia are continuously dripped into the reactor. The pH is set to 10.5. The final precursor particles are washed, filtered and dried. The plot of FIG. 10 shows a D50 of 23.38 microns and D10/D90 of 0.49. The final precursor particles have a minimum size of 2.00 microns, a maximum size of 37.96 microns, a mean of 23.01 microns, a standard deviation of 5.90 microns, a D10 of 14.83 microns, and a D90 of 30.15 microns. The tap density of the dry powder is measured to be 0.86 g/cm$^3$.

EXAMPLE 5

2.5 liters of distilled water were introduced into a 4-liter CSTR for a co-precipitation reaction with a rate of 20 ml/min of nitrogen gas protection and agitated at 1200 rpm while maintaining a reactor temperature of 55° C. A 2-molar metal aqueous solution in which nickel sulfate, manganese sulfate, and cobalt sulfate were mixed at a mole ratio of 1:2:97 (target composition Ni$_{0.01}$Mn$_{0.02}$Co$_{0.97}$(OH)$_2$) was continuously added into the reactor at 0.1 liters/hour, and a 5-molar ammonia hydroxide solution was also continuously added into the reactor at 0.46 liters/hour. In addition, the pH is fixed at 10.5 by adding a 10-molar aqueous solution of sodium hydroxide using a pH controller/pump. The average time of retaining the solution in the reactor was maintained at 11 hours by controlling the amount of flow into the reactor. The total run time is about 12 hours. The final precursor particles are washed, filtered and dried.

Figure 11:
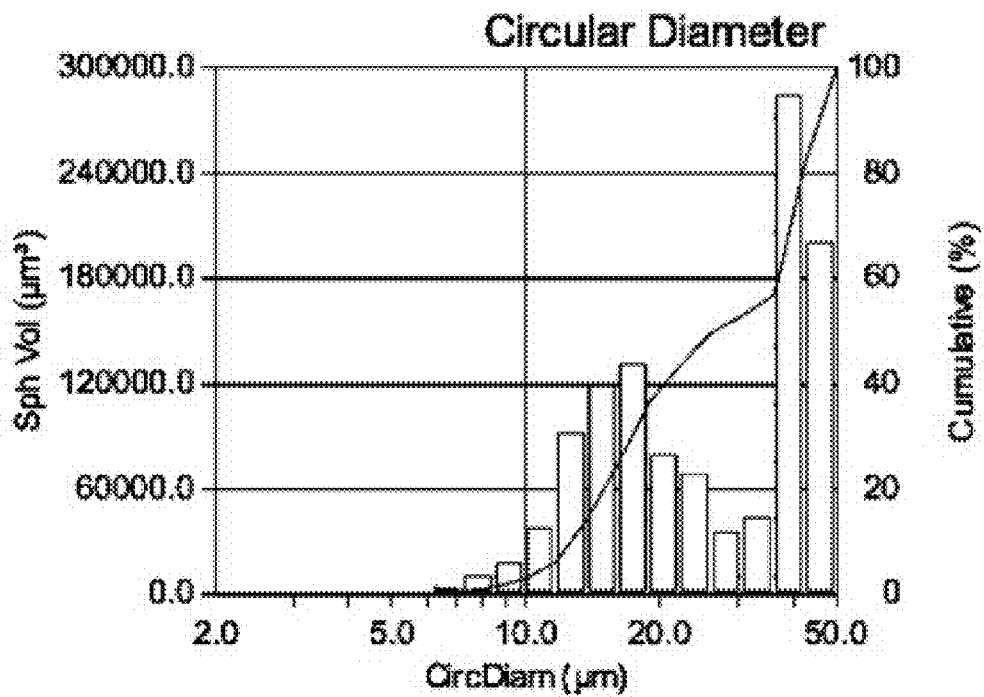
FIG. 11 shows a histogram and a cumulative distribution of the particle sizes of a precursor co-precipitate material for a cathode active material composition in accordance with the disclosed embodiments.
Figure 12:
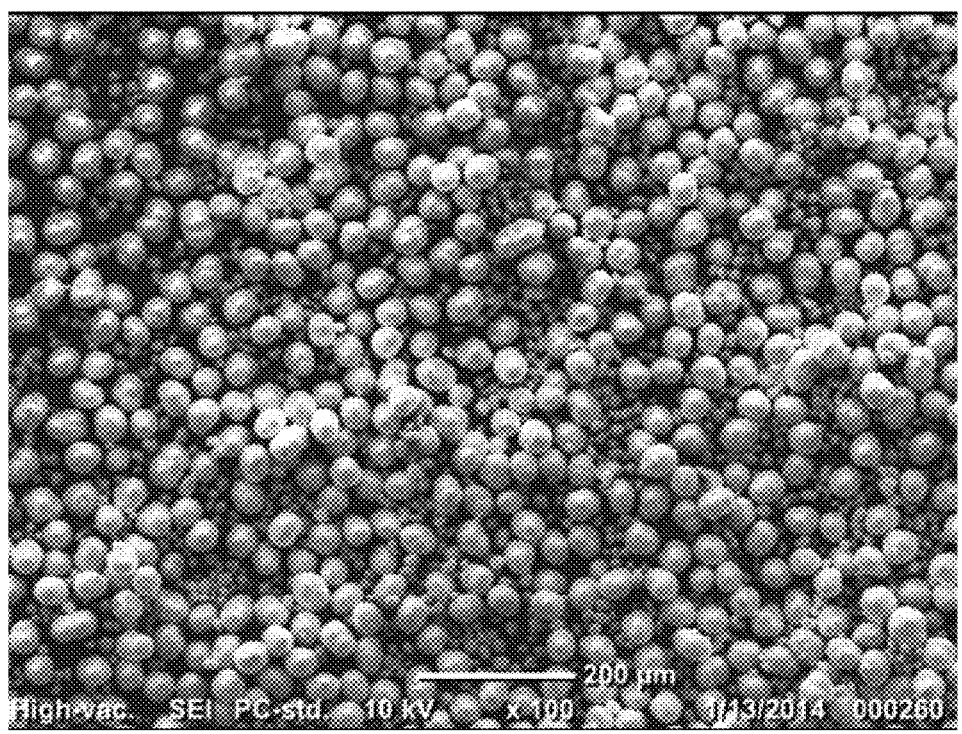
FIG. 12 shows an SEM of a precursor co-precipitate material for a cathode active material composition in accordance with the disclosed embodiments.
Figure 13:
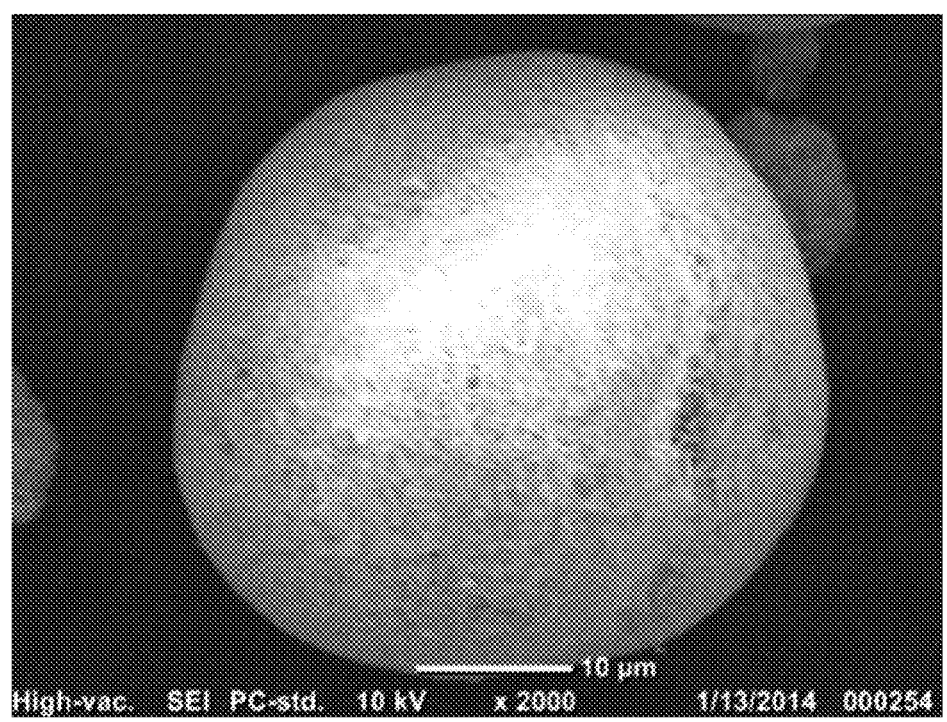
FIG. 13 shows an SEM of a precursor co-precipitate material for a cathode active material composition in accordance with the disclosed embodiments.

As shown in the plot of FIG. 11, a particle size analysis of the precursor after 8 hours of growth shows a D50 of 25 microns. The precursor additionally has a minimum size of 2.00 microns, a maximum size of 48.23 microns, a mean of 28.61 microns, a standard deviation of 13.08 microns, a D10 of 12.84 microns, and a D90 of 44.94 microns. The tap density of the dry powder is measured to be 0.96 g/cm$^3$. From the SEMs of FIGS. 12-13, the particles are uniform spherical shapes, the surfaces of the particles are smooth, and the secondary particles are about 25 microns in diameter.

Metal hydroxide precursors were also prepared using the procedure of Example 5. The compositions of the precursors were set to Co(OH)$_2$, Co$_{0.96}$Mn$_{0.04}$(OH)$_2$, Co$_{0.94}$Ni$_{0.02}$Mn$_{0.04}$(OH)$_2$, and Co$_{0.94}$Mg$_{0.02}$Mn$_{0.04}$(OH)$_2$.

EXAMPLE 6

A co-precipitation reaction is run as in Example 5. 2.5 liters of distilled water were introduced into a 4-liter CSTR for a co-precipitation reaction with a rate of 20 ml/min of nitrogen gas protection and agitated at 1200 rpm while maintaining a reactor temperature of 55° C. A 2-molar metal aqueous solution in which nickel sulfate, manganese sulfate, and cobalt sulfate were mixed at a mole ratio of 1:2:97 (target composition Ni$_{0.01}$Mn$_{0.02}$CO$_{0.97}$(OH)$_2$) was continuously added into the reactor at 0.1 liters/hour, and a 5-molar ammonia hydroxide solution was also continuously added into the reactor at 0.1 liters/hour. In addition, the pH is fixed at 11 by adding a 10-molar aqueous solution of sodium hydroxide using a pH controller/pump. The average time of retaining the solution in the reactor was maintained at 11 hours by controlling the amount of flow into the reactor. The total run time is about 24 hours. The final precursor particles are washed, filtered and dried.

Figure 14:
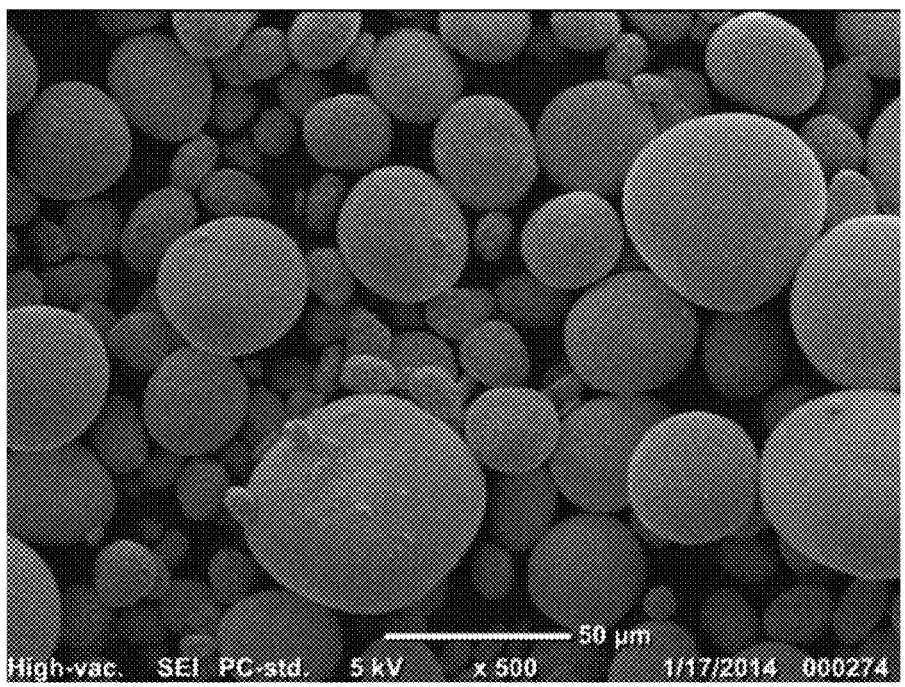
FIG. 14 shows an SEM of a precursor co-precipitate material for a cathode active material composition in accordance with the disclosed embodiments.
Figure 15:
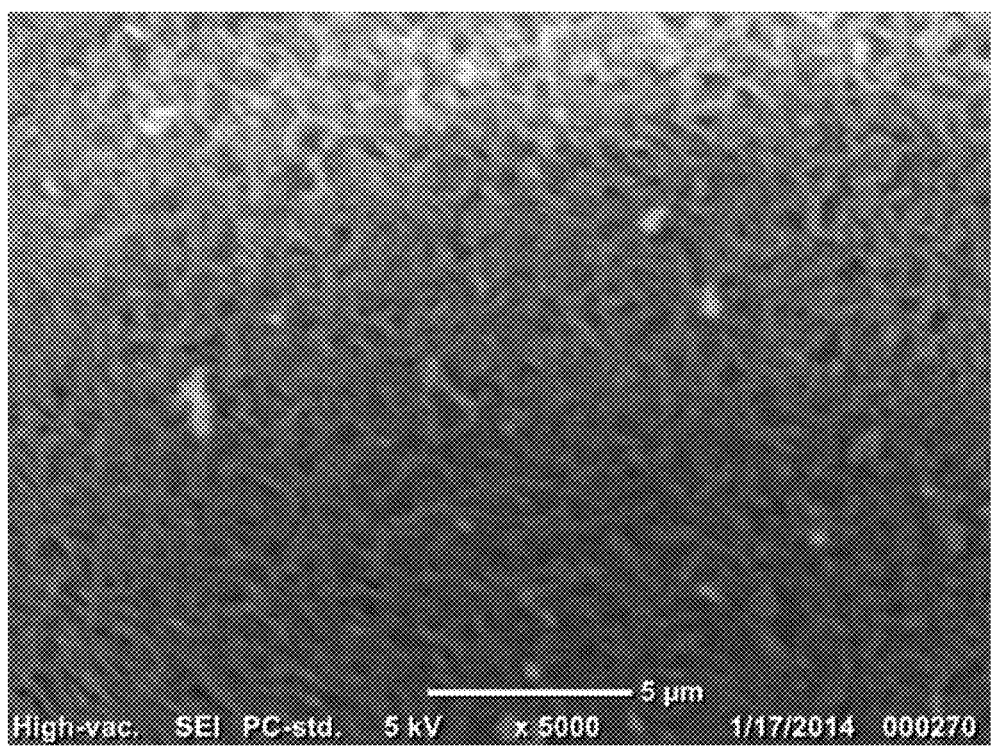
FIG. 15 shows an SEM of a precursor co-precipitate material for a cathode active material composition in accordance with the disclosed embodiments.

From the SEMs of FIGS. 14-15, the particles are spherical shapes, the surfaces of the particles are smooth, and the secondary particles are about 10-40 μm in diameter. The surface area of the precursor is 15.10 m$^2$/g, and the tap density of the particles is about 1.1 g/cc.

EXAMPLE 7

A co-precipitation reaction is run as in Example 6. Initially, 2.5 liters of a 0.5-molar sodium sulfate and 1-molar ammonia solution were added into a 4-liter CSTR for a co-precipitation reaction, with a rate of 200 ml/min of nitrogen gas protection and agitated at 1200 rpm, while maintaining a reactor temperature of 55° C. A 2-molar metal aqueous solution in which nickel sulfate, manganese sulfate, and cobalt sulfate were mixed at a mole ratio of 2:2:96 (target composition $Ni_{0.02}Mn_{0.02}Co_{0.96}(OH)_2$) was continuously added into the reactor, and a 5-molar ammonia hydroxide solution was also continuously added into the reactor. In addition, the pH was fixed at 11 by adding a 10-molar aqueous solution of sodium hydroxide using a pH controller/pump. The average time of retaining the solution in the reactor was maintained at 20 hours by controlling the amount of flow into the reactor. The total run time was about 72 hours. The final precursor particles were washed, filtered and dried.

The particles are spherically shaped and smooth. Secondary particles have a D50 of 40 micrometers, with a D10/D90 of 0.7. The tap density of the particles is 1.7 g/cc.

EXAMPLE 8

2.5 liters of 1-molar aqueous ammonia solution were introduced into a 4-liter CSTR for a co-precipitation reaction with a rate of 20 ml/min of nitrogen gas protection and agitated at 1200 rpm while maintaining a reactor temperature of 55° C. A 1-molar metal aqueous solution in which manganese sulfate, and cobalt sulfate were mixed at a mole ratio of 4:96 (target composition $Mn_{0.04}Co_{0.96}(OH)_2$) was continuously added into the reactor at 0.2 liters/hour, and a 5-molar ammonia hydroxide solution was also continuously added into the reactor at 0.05 liters/hour. In addition, the pH is fixed at 11.5 by adding a 10-molar aqueous solution of sodium hydroxide using a pH controller/pump. The average time of retaining the solution in the reactor was maintained at 6.57 hours by controlling the amount of flow into the reactor. The total run time is about 24 hours. The final precursor particles are washed, filtered and dried. The tap density of the dry powder is measured to be 1.78 g/cm$^3$.

EXAMPLE 9

A co-precipitation reaction is run as in Example 8. 2.5 liters of 1-molar aqueous ammonia solution were introduced into a 4-liter CSTR for a co-precipitation reaction with a rate of 20 ml/min of nitrogen gas protection and agitated at 1200 rpm while maintaining a reactor temperature of 55° C. A 1-molar metal aqueous solution in which manganese sulfate, cobalt sulfate and magnesium sulfate were mixed at a mole ratio of 4:95.9:0.1 (target composition $Mn_{0.04}Co_{0.959}Mg_{0.001}(OH)_2$) was continuously added into the reactor at 0.2 liters/hour, and a 5-molar ammonia hydroxide solution was also continuously added into the reactor at 0.05 liters/hour. In addition, the pH is fixed at 11.5 by adding a 2-molar aqueous solution of sodium hydroxide using a pH controller/pump. The average time of retaining the solution in the reactor was maintained at 6.57 hours by controlling the amount of flow into the reactor. The total run time is about 24 hours. The final precursor particles are washed, filtered and dried. The tap density of the dry powder is measured to be 1.5 g/cm3.

Figure 16:
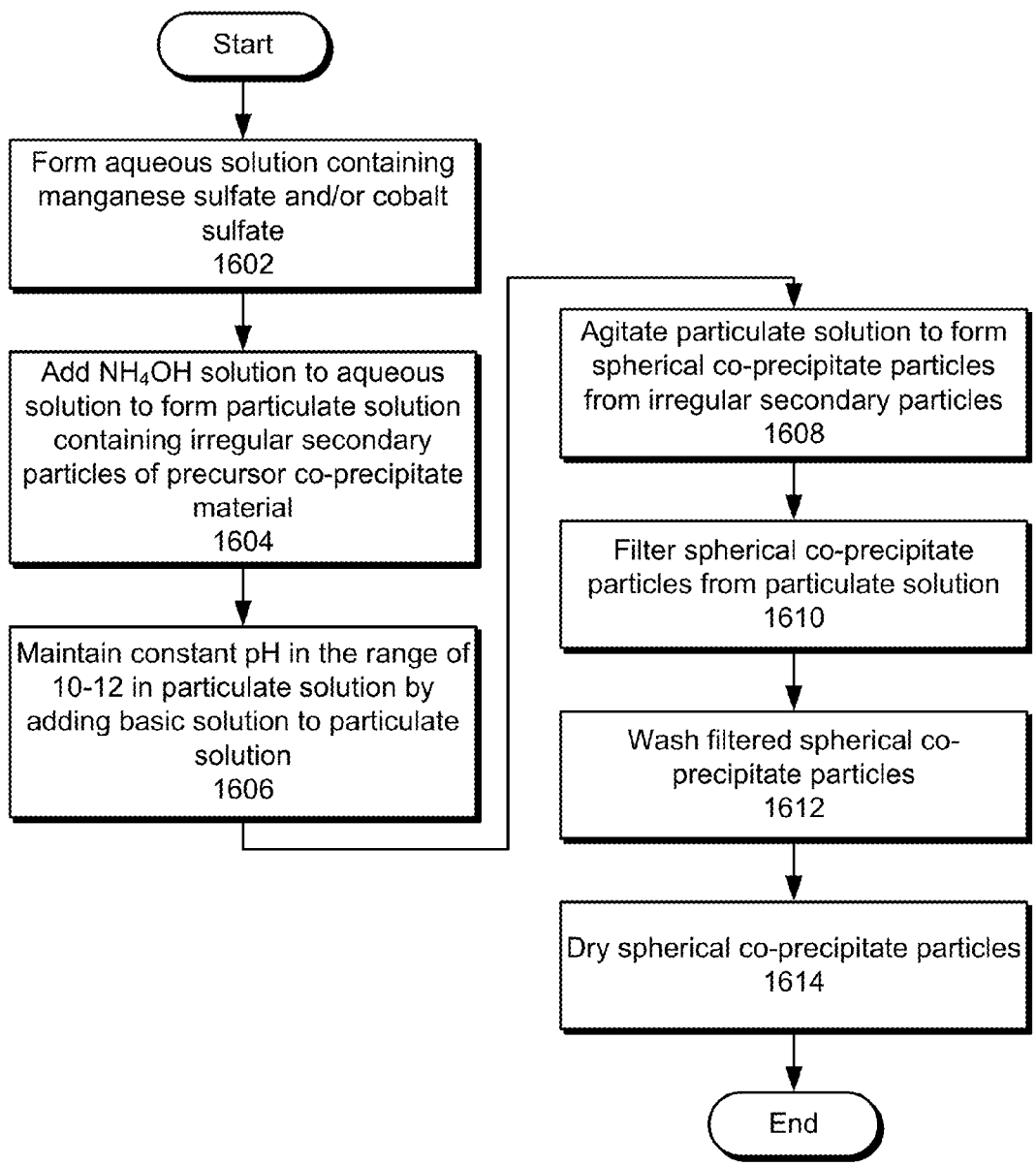
FIG. 16 presents a flow chart illustrating the process of manufacturing a precursor co-precipitate material for a cathode active material composition in accordance with the disclosed embodiments.

FIG. 16 presents a flow chart illustrating the process of manufacturing a precursor co-precipitate material for a cathode active material composition in accordance with the disclosed embodiments. In one or more embodiments, one or more of the steps may be omitted, repeated, and/or performed in a different order. Accordingly, the specific arrangement of steps shown in FIG. 16 should not be construed as limiting the scope of the embodiments.

The initial composition of the aqueous solution in the reactor at the beginning of the coprecipitation process contains at least one or a mixture of the following solutions: distilled water, ammonia, sodium sulfate, and/or a mother liquid, which consists of a coprecipitation solution taken from a previous process batch.

An aqueous solution containing a manganese and/or cobalt sulfate is formed (operation 1602). For example, the aqueous solution may be dripped into a CSTR by a feeding mechanism. In addition, a concentration of the nickel, manganese, and cobalt sulfates in the aqueous solution may range from 0.5 mol/L to 5 mol/L.

Next, a NH$_4$OH solution is added to the aqueous solution to form a particulate solution containing irregular secondary particles of the precursor co-precipitate material (operation 1604). The particulate solution may be maintained at a constant temperature in the range of 30-65° C. and formed in an inert gas atmosphere containing nitrogen, argon, and/or another inert gas. A constant pH in the range of 10-12 is also maintained in the particulate solution by adding a basic solution to the particulate solution (operation 1606). The basic solution may include an alkali metal hydroxide with a concentration in the range of 0.5 mol/L to 10 mol/L, an alkali carbonate, and/or an alkali oxalate.

The particulate solution is further agitated (e.g., in the CSTR) to form spherical co-precipitate particles from the irregular secondary particles (operation 1608). Such agitation may be performed for 3-12 hours to form spherical co-precipitate particles with a median particle size of greater than 15 microns. After the spherical co-precipitate particles have reached their desired size, the spherical co-precipitate particles are filtered from the particulate solution (operation 1610), washed (operation 1612), and dried (operation 1614).

The spherical co-precipitate particles may then be used to form a cathode active material composition for use in a lithium-ion battery. For example, spherical precursor particles formed using the solution co-precipitation reaction described above may have a composition represented by $Mn_xM_yCo_z(OH)_2$, with $0.01 \leq x < 1.00$, $0 \leq y < 1.00$, and $0.50 \leq z < 1.00$. M may include one or more metal cations selected preferably from one or more monovalent, divalent, trivalent or tetravalent cations and Ru, examples of which are $Li^+$, $Ni^{2+}$, $Ni^{3+}$, $Cu^+$, $Cu^{2+}$, $Mg^{2+}$, $Zn^{2+}$, $B^{3+}$, $Ga^{3+}$, $Al^{3+}$, $Mn^{3+}$, $Mn^{4+}$, $Sn^{4+}$, $Ti^{4+}$, and/or $Ru^{4+/5+/6+}$. If M is a mixture of metal cations, the stoichiometric numbers of the metal cations do not have to be equal. The precursor may be mixed with a lithium salt and heated to 1000° C. in a solid-state reaction to form a cathode active material composition represented by $xLi_2M'O_3 \cdot (1-x)LiCo_yM''_{(1-y)}O_2$. In the cathode active material composition, Ni, Co, M' and M'' possess an average oxidation state of three. The cathode active material composition may then be used in the cathode active coating of a battery cell to increase the reversible capacity of the battery cell's cathode.

Figure 17:
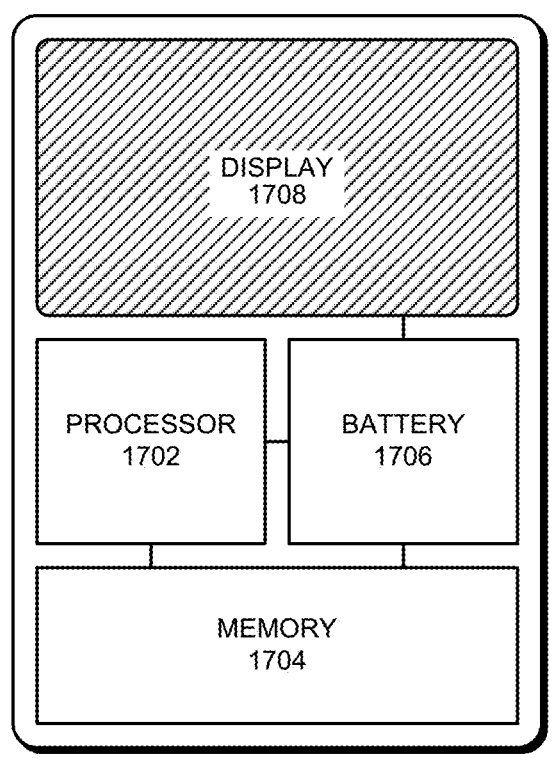
FIG. 17 shows a portable electronic device in accordance with the disclosed embodiments.

The above-described rechargeable battery cell can generally be used in any type of electronic device. For example, FIG. 17 illustrates a portable electronic device 1700 which includes a processor 1702, a memory 1704 and a display 1708, which are all powered by a battery 1706. Portable electronic device 1700 may correspond to a laptop computer, mobile phone, PDA, tablet computer, portable media player, digital camera, and/or other type of battery-powered electronic device. Battery 1706 may correspond to a battery pack that includes one or more battery cells. Each battery cell may include an anode containing an anode current collector and an anode active material disposed over the anode current collector. The battery cell may also include a cathode containing a cathode current collector and a cathode active material disposed over the cathode current collector. The cathode active material may be formed using spherical precursor co-precipitate particles having a composition represented by $Mn_xM_yCo_z(OH)_2$, with $0.01 \leq x < 1.00$, $0 \leq y < 1.00$, and $0.50 \leq z < 1.00$. The cathode and anode may be sealed in a flexible pouch.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A compound having a composition represented by $Mn_xM_yCo_z(OH)_2$ wherein $x=0.04$, $y=0$, $z=0.96$; and
    wherein M comprises one or more metal cations selected from the group consisting of monovalent, divalent, trivalent or tetravalent cations and Ru.

2. A compound having a composition represented by $Mn_xM_yCo_z(OH)_2$ wherein $x=0.04$, $y=0.02$, $z=0.94$ and M is Ni.

3. A compound having a composition represented by $Mn_xM_yCo_z(OH)_2$ wherein $x=0.04$, $y=0.02$, $z=0.94$ and M is Mg.

4. A compound having a composition represented by $Mn_xM_yCo_z(OH)_2$ wherein $x=0.02$, $y=0.01$, $z=0.97$ and M is Ni.

5. A compound having a composition represented by $Mn_xM_yCo_z(OH)_2$ wherein $x=0.04$, $y=0.001$, $z=0.95$ and M is Mg.

* * * * *